United States Patent
Chang et al.

(10) Patent No.: US 11,334,284 B2
(45) Date of Patent: May 17, 2022

(54) DATABASE OFFLOADING ENGINE

(71) Applicant: Samsung Electronics Co., Ltd., Suwon-si (KR)

(72) Inventors: Andrew Zhenwen Chang, Los Altos, CA (US); Jongmin Gim, Milpitas, CA (US); Hongzhong Zheng, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 257 days.

(21) Appl. No.: 16/195,732

(22) Filed: Nov. 19, 2018

(65) Prior Publication Data

US 2020/0097210 A1 Mar. 26, 2020

Related U.S. Application Data

(60) Provisional application No. 62/735,688, filed on Sep. 24, 2018.

(51) Int. Cl.
*G06F 3/06* (2006.01)
*G06F 21/62* (2013.01)

(52) U.S. Cl.
CPC ............ *G06F 3/0656* (2013.01); *G06F 3/061* (2013.01); *G06F 3/067* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 8,194,607 B2 * | 6/2012 | Lee | H04W 36/02 370/331 |
| 8,700,822 B2 | 4/2014 | Graefe | |
| 9,811,476 B2 * | 11/2017 | Maeda | G06F 12/1408 |
| 9,910,618 B1 | 3/2018 | Curley et al. | |
| 9,966,152 B2 | 5/2018 | Hu et al. | |
| 2008/0192700 A1 * | 8/2008 | Lee | H04W 36/02 370/331 |
| 2012/0047126 A1 | 2/2012 | Branscome et al. | |

(Continued)

FOREIGN PATENT DOCUMENTS

WO WO 2015/108931 A1 7/2015

OTHER PUBLICATIONS

Patrick, Gordon, "Developments in Persistent Memory", IMC Summit 2016 Breakout, Jun. 28, 2016, pp. 1-5.

(Continued)

*Primary Examiner* — Kim T Nguyen
(74) *Attorney, Agent, or Firm* — Lewis Roca Rothgerber Christie LLP

(57) ABSTRACT

A database offloading engine. In some embodiments, the database offloading engine includes a vectorized adder including a plurality of read-modify-write circuits, a plurality of sum buffers respectively connected to the read-modify-write circuits, a key address table, and a control circuit. The control circuit may be configured to receive a first key and a corresponding first value; to search the key address table for the first key; and, in response to finding, in the key address table, an address corresponding to the first key, to route the address and the first value to a read-modify-write circuit, of the plurality of read-modify-write circuits, corresponding to the address.

15 Claims, 10 Drawing Sheets

(56) References Cited

U.S. PATENT DOCUMENTS

| | | | |
|---|---|---|---|
| 2013/0275364 A1* | 10/2013 | Wang | G06F 16/283 |
| | | | 707/602 |
| 2013/0275365 A1* | 10/2013 | Wang | G06F 16/283 |
| | | | 707/602 |
| 2013/0282650 A1* | 10/2013 | Zhang | G06F 16/283 |
| | | | 707/605 |
| 2017/0192821 A1 | 7/2017 | Ki et al. | |
| 2017/0228190 A1 | 8/2017 | Guddekoppa | |
| 2017/0255508 A1* | 9/2017 | Lee | G06F 11/1016 |
| 2017/0262503 A1 | 9/2017 | Bellamkonda | |
| 2018/0089074 A1* | 3/2018 | Li | G06F 12/0238 |
| 2018/0107406 A1 | 4/2018 | O et al. | |
| 2019/0042571 A1* | 2/2019 | Li | G06F 3/061 |
| 2019/0087130 A1* | 3/2019 | Lee | G06F 3/065 |

OTHER PUBLICATIONS

Hemsoth, Nicole, "Momentum Gathers for Persistent Memory Preppers", Feb. 7, 2018, pp. 1-9, https://www.nextplatform.com/2018/02/07/momentum-gathers-persistent-memory-preppers/.

* cited by examiner

DATABASE OFFLOADING ENGINE

CROSS-REFERENCE TO RELATED APPLICATION(S)

The present application claims priority to and the benefit of U.S. Provisional Application No. 62/735,688, filed Sep. 24, 2018, entitled "HIGHLY SCALABLE DATABASE OFFLOADING ENGINE FOR (K,V) AGGREGATION AND TABLE SCAN", the entire content of which is incorporated herein by reference.

FIELD

One or more aspects of embodiments according to the present disclosure relate to database processing, and more particularly to a database offloading engine.

BACKGROUND

Table scan and sum aggregation operations, when performed by a host CPU as part of query processing operations in a database, may significantly burden the CPU, consuming a significant fraction of CPU cycles and accounting for a significant fraction of the power consumed by the CPU.

Thus, there is a need for an improved system and method for performing table scan and sum aggregation operations in a database.

SUMMARY

According to an embodiment of the present invention, there is provided a database processing system, including a database offloading engine, the database offloading engine including: a vectorized adder including a plurality of read-modify-write circuits; a plurality of sum buffers respectively connected to the read-modify-write circuits; a key address table; and a control circuit, the control circuit being configured: to receive a first key and a corresponding first value; to search the key address table for the first key; and in response to finding, in the key address table, an address corresponding to the first key, to route the address and the first value to a read-modify-write circuit, of the plurality of read-modify-write circuits, corresponding to the address.

In some embodiments, the control circuit is further configured: to receive a second key and a corresponding second value; to search the key address table for the second key; and in response to not finding, in the key address table, an address corresponding to the second key: to select a new address, the new address being absent from the key address table; to store the second key and the new address in the key address table; and to route the new address and the second value to a read-modify-write circuit, of the plurality of read-modify-write circuits, corresponding to the new address.

In some embodiments, the database offloading engine has an NVDIMM-p interface for making a connection to a host.

In some embodiments, the database offloading engine has a PCIe interface for making a connection to a host.

In some embodiments: the vectorized adder is a synchronous circuit within one clock domain, the clock domain being defined by a shared system clock, a read-modify-write circuit of the plurality of read-modify-write circuits is configured as a pipeline including: a first stage for performing a read operation, a second stage for performing an addition operation, and a third stage for performing a write operation, and the pipeline is configured to receive an address and a corresponding value with each cycle of the shared system clock.

In some embodiments: the control circuit is a synchronous circuit within one clock domain, the clock domain being defined by a shared system clock, the control circuit includes a lookup circuit for searching the key address table for a key, the lookup circuit is configured as a pipeline including a plurality of stages for searching the key address table, the pipeline is configured to receive a key with each cycle of the shared system clock.

In some embodiments, the database processing system further includes a host connected to the database offloading engine, the host including a non-transitory storage medium storing: database application instructions, and driver layer instructions, the database application instructions including function calls that, when executed by the host, cause the host to execute driver layer instructions that cause the host to control the database offloading engine to perform a sum aggregation operation.

In some embodiments, the database offloading engine further includes a plurality of table scanning circuits; a table scanning circuit of the plurality of table scanning circuits including: a condition test circuit programmable with a condition, an input buffer, and an output buffer, the condition test circuit being configured: to determine whether the condition is satisfied for a first entry at a first address in the input buffer, and in response to determining that the condition is satisfied for the first entry, to write a corresponding result into the output buffer.

In some embodiments, the condition test circuit is configured, in response to determining that the condition is satisfied for the first entry, to write a one to a corresponding element of an output vector in the output buffer.

In some embodiments, the condition test circuit is configured, in response to determining that the condition is satisfied for the first entry, to write the first address to a corresponding element of an output vector in the output buffer.

In some embodiments: the vectorized adder is a synchronous circuit within one clock domain, the clock domain being defined by a shared system clock, a read-modify-write circuit of the plurality of read-modify-write circuits is configured as a pipeline including: a first stage for performing a read operation, a second stage for performing an addition operation, and a third stage for performing a write operation, and the pipeline is configured to receive an address and a corresponding value with each cycle of the system clock.

In some embodiments: the control circuit is a synchronous circuit within one clock domain, the clock domain being defined by a shared system clock, the control circuit includes a lookup circuit for searching the key address table for a key, the lookup circuit is configured as a pipeline including a plurality of stages for searching the key address table, the pipeline is configured to receive a key with each cycle of the system clock.

In some embodiments, the database offloading engine has an NVDIMM-p interface for making a connection to a host.

According to an embodiment of the present invention, there is provided a database processing system, including a database offloading engine, the database offloading engine including: a plurality of table scanning circuits; a table scanning circuit of the plurality of table scanning circuits including: a condition test circuit programmable with a condition, an input buffer, and an output buffer, the condition test circuit being configured: to determine whether the condition is satisfied for a first entry at a first address in the input buffer, and in response to determining that the condition is satisfied for the first entry, to write a corresponding result into the output buffer.

In some embodiments, the condition test circuit is configured, in response to determining that the condition is satisfied for the first entry, to write a one to a corresponding element of an output vector in the output buffer.

In some embodiments, the condition test circuit is configured, in response to determining that the condition is satisfied for the first entry, to write the first address to a corresponding element of an output vector in the output buffer.

In some embodiments, the database offloading engine has an NVDIMM-p interface for making a connection to a host.

In some embodiments, the database offloading engine has a PCIe interface for making a connection to a host.

According to an embodiment of the present invention, there is provided a method for offloading database operations from a host, the method including: calling, by an application running on the host, a driver function for performing a sum aggregation operation, performing the sum aggregation operation, by a database offloading engine, the database offloading engine including: a vectorized adder including a plurality of read-modify-write circuits; a plurality of sum buffers respectively connected to the read-modify-write circuits; a key address table; and a control circuit, the performing of the sum aggregation operation including: receiving a first key and a corresponding first value; searching the key address table for the first key; in response to finding, in the key address table, an address corresponding to the first key, routing the address and the first value to a read-modify-write circuit, of the plurality of read-modify-write circuits, corresponding to the address; receiving a second key and a corresponding second value; searching the key address table for the second key; in response to not finding, in the key address table, an address corresponding to the second key: selecting a new address absent from the key address table; storing the key and the new address in the key address table; and routing the new address and the second value to a read-modify-write circuit, of the plurality of read-modify-write circuits, corresponding to the new address.

In some embodiments, the method further includes: calling, by the application, a driver function for performing a table scan operation, performing the table scan operation, by the database offloading engine, the performing of the table scan operation including: determining, by a condition test circuit of the database offloading engine, whether a condition is satisfied for a first entry at a first address in an input buffer of the database offloading engine, and in response to determining that the condition is satisfied for the first entry in the input buffer, writing a corresponding result into an output buffer of the database offloading engine.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a database offloading engine provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
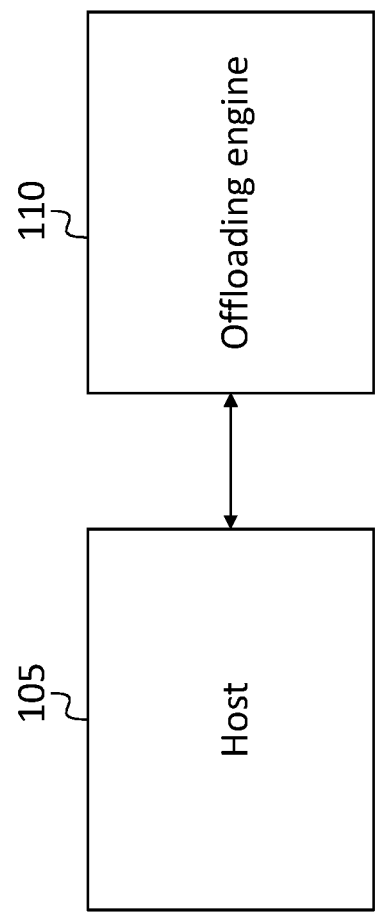
FIG. 1 is a block diagram of a database processing system, according to an embodiment of the present disclosure.

Referring to FIG. 1, in some embodiments a database processing system includes a host 105 and a database offloading engine 110; the database offloading engine 110 may be part of the host, or it may be connected to the host, as shown. For example, the host 105 may be a computer or server, including a central processing unit (CPU), a main memory, and persistent storage (e.g., a hard drive or solid state drive). The database offloading engine 110 may include, or be connected to, persistent memory. Persistent memory is a class of memory that balances speed, capacity and persistence. One of the advantage of offloading aggregation and table scan operations closer to data is that these operations are data intensive rather than compute intensive. The database offloading engine 110 may include a processing circuit (discussed in further detail below) and memory. The database offloading engine 110 may be connected to the host through any of several interfaces, including NVDIMM-p (via a memory channel) and PCIe. The host may perform various database processing operations, including executing queries.

Figure 2:
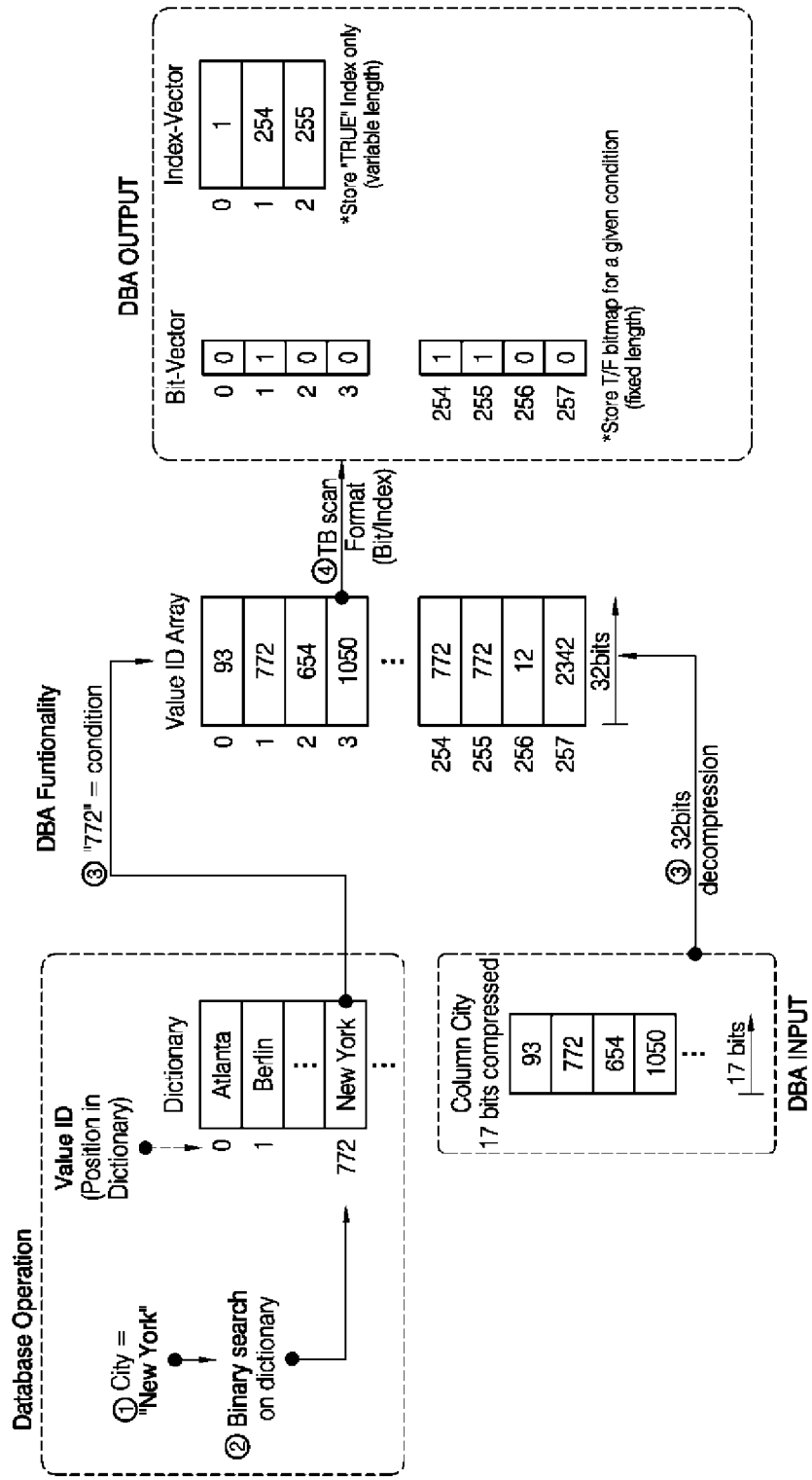
FIG. 2 is a process flow diagram for a table scan operation, according to an embodiment of the present disclosure.

One example of a database processing operation is a table scan operation. Referring to FIG. 2, a table scan operation may include searching an entire column of a table of the database for entries that satisfy a condition. The condition may be part of, or derived from, a query that the host is executing. In the example of FIG. 2, the table scan to be performed requires identifying every entry, in the column, corresponding to "New York", where the name "New York" corresponds, according to a dictionary (also stored in the database) to the integer 772. The column to be searched may be stored in compressed form, with 17 bits per entry. To perform the table scan, the database processing system decompresses the column to be searched (converting each 17-bit number into a 32-bit number), and tests, for each entry, whether the entry satisfies the condition (in this case, whether the decompressed integer equals 772). The result of the scan may be represented in one of two formats, either (i) as a vector, having the same number of elements as the column that was searched (257 elements in the example of FIG. 2), containing a one for each entry that satisfies the condition and a zero for each entry that doesn't satisfy the condition, or (ii) as a vector of the index (or address), within the column, of each element in the column that satisfies the condition. In some embodiments, the vector instead contains the address of each element that does not satisfy the condition.

Another example of a database processing operation is a sum aggregation operation. Such an operation may be performed on a key value table, which may be a two-column table in which one column includes a set of keys (with, e.g., each key being a 4-byte number), and the other column includes a set of corresponding values (with, e.g., each value being an 8-byte number). Some of the keys may be repeated (in any order); for example, the key 23876 may appear 27 times in the table, with up to 27 different respective corresponding values. A sum aggregation operation generates, from a first key value table, a second key value table, in which each key appears exactly once (e.g., in sorted, ascending order), and in which the value corresponding to each key is the sum of all of the values corresponding, in the first key value table, to the key.

Table scan and sum aggregation operations may be performed by the host, along with other database processing operations, such as GroupBy operations. It will be understood that the example of GroupBy operations is just one example, and that in general the host may perform any operations on the data. When table scan and sum aggregation operations are performed by the host, they may consume a significant fraction of the processing cycles of the host; as such, if these operations are instead performed by (i.e., offloaded, by the host, to) a database offloading engine, the overall processing speed of the database processing system may be significantly increased. Moreover, power consumption may be reduced, for example, if the database offloading engine employs specialized hardware designed for, e.g., table scan and sum aggregation operations, which may require less energy to perform a given operation than the general purpose hardware of the host CPU.

Figure 3:
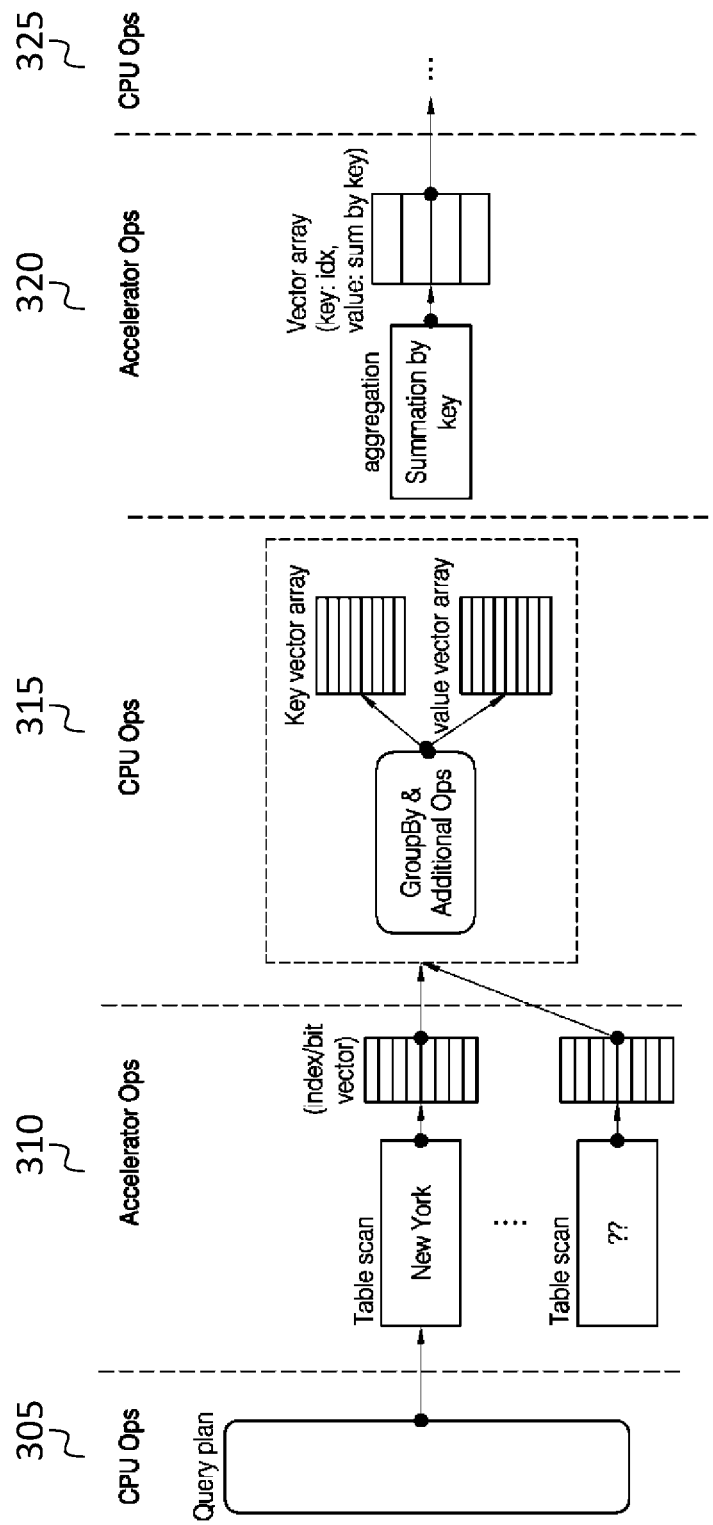
FIG. 3 is a process flow diagram for a sequence of database processing operations, according to an embodiment of the present disclosure.

FIG. 3 shows a processing flow illustrating such offloading for a performance improvement. In a first step 305, the host CPU generates a query plan, which includes a table scan operation and a sum aggregation operation. In a second step 310, the database offloading engine (or "accelerator") performs the table scan operation. In a third step 315, the host CPU performs additional database operations including a GroupBy operation. In a fourth step 320, the database offloading engine performs the sum aggregation operation. In a subsequent step 325 and possibly in other subsequent steps, the host CPU then performs additional database operations, using the results of the table scan operation and/or the sum aggregation operation.

Figure 4:
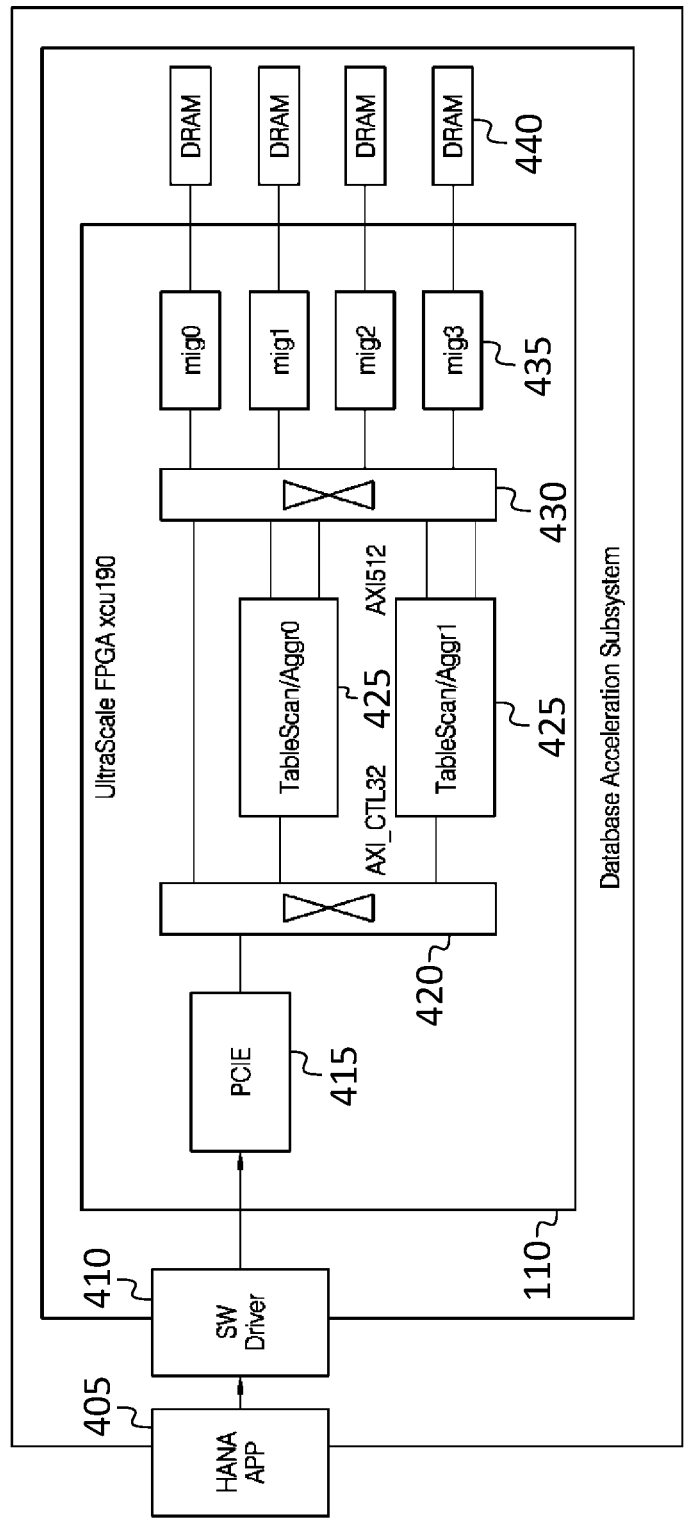
FIG. 4 is a block diagram of a database processing system, according to an embodiment of the present disclosure.

FIG. 4 shows a block diagram of a database offloading engine, according to one embodiment, as well as two software layers that interact with it. A database application 405, e.g., a SAP HANA database application, runs on the host, and, using suitable calls to a driver layer 410, offloads database operations such as table scan operations and sum aggregation operations to the database offloading engine 110. The database offloading engine 110 includes a PCIe interface for communicating with the host, a first parallelizer 420 for routing offloaded database operations to any of several (in the example of FIG. 4, two) database offloading circuits 425, and a second parallelizer 430 for making connections between the offloading circuits 425 and a plurality of memory interface circuits 435. The database offloading engine 110 may be connected to a plurality of memories 440 as shown, or, in some embodiments, the memories 440 may be part of the database offloading engine 110. In some embodiments, the database offloading engine 110 includes more than two offloading circuits 425, e.g., it may include 8 or more, 16 or more, or 32 or more of such circuits.

Figure 5:
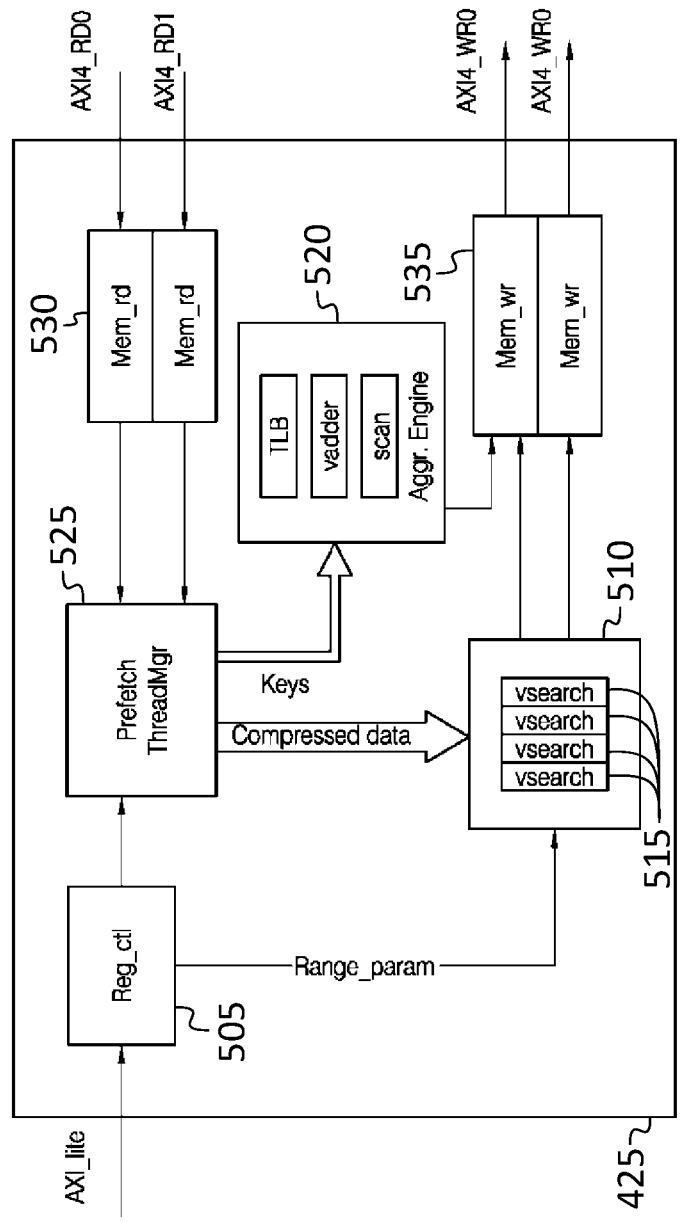
FIG. 5 is a block diagram of a database offloading engine, according to an embodiment of the present disclosure.

Referring to FIG. 5, an offloading circuit 425 may include a set of control registers 505, which the host may employ to control the operation of the offloading circuit 425. The offloading circuit 425 may further include a vectorized table scanning circuit 510 including a plurality of table scanning circuits 515, a sum aggregation circuit 520, and a prefetch circuit 525. The table scanning circuits 515 and the sum aggregation circuit 520 may perform table scan operations and sum aggregation operations, respectively, as discussed in further detail below, and the prefetch circuit 525 may fetch data from the memories 440, and save the fetched data in respective buffers in the table scanning circuits 515 and in the sum aggregation circuit 520, concurrently with the performing of database processing operations in the table scanning circuits 515 and in the sum aggregation circuit 520. The vectorized table scanning circuit 510 may receive compressed data and decompress it before processing it further. The prefetch circuit 525 may fetch data from the memories 440 using memory read circuits 530, and the results of the table scan operations and of the sum aggregation operations may be written to the memories 440 using memory write circuits 535.

Figure 6:
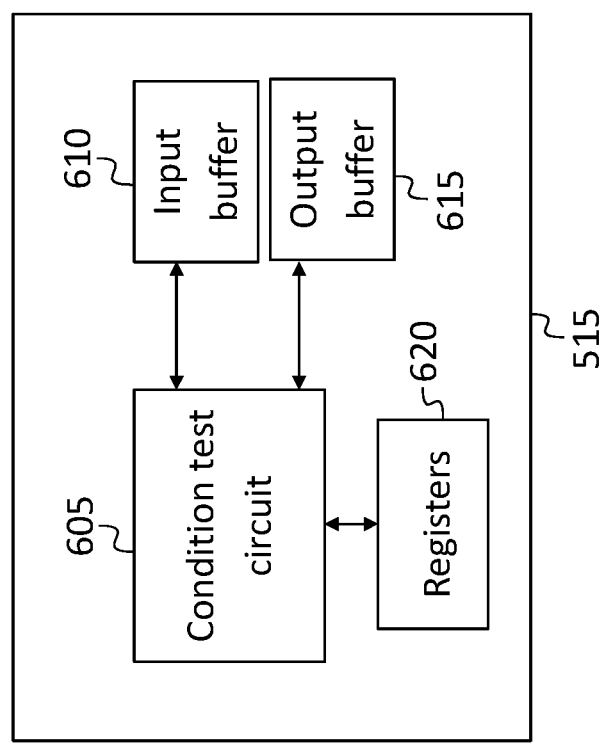
FIG. 6 is a block diagram of a table scanning circuit, according to an embodiment of the present disclosure.

Referring to FIG. 6, each of the table scanning circuits 515 may include a condition test circuit 605, an input buffer 610, an output buffer 615, and a set of registers 620. The registers may include a pointer into the input buffer 610, a pointer into the output buffer 615, and one or more registers specifying the condition to be tested. The registers specifying the condition may include one or more value registers specifying reference values, and one or more relationship registers specifying a relationship. If, for example, a first relationship register contains a value that corresponds to the relationship "equals" and a corresponding value register contains the value 37, then the condition test circuit 605 may generate a one if the current input buffer value (the value at the address, in the input buffer, identified by the pointer into the input buffer) equals 37. If the result of the scan being performed is to be formatted as a vector containing a one for each entry that satisfies the condition and a zero for each entry that doesn't satisfy the condition, then the condition test circuit 605 may then write the current result (e.g., the one) into the output buffer 615, at the address, in the output buffer, identified by the pointer into the output buffer. After each time that a test is performed by the condition test circuit 605, both the pointer into the input buffer 610, and the pointer into the output buffer 615 may be incremented. If instead the result of the scan being performed is to be formatted as a vector of the index (or address), within the column, of each element in the column that satisfies the condition, then the condition test circuit 605 may write into the output buffer only when the current result is a one (i.e., when the condition is satisfied), and, on those occasions it may write the index (or address) in the column being scanned of the current entry (the entry being tested) into the output buffer. After each time that a test is performed by the condition test circuit 605, the pointer into the input buffer 610 may be incremented, and after each time that the condition test circuit 605 writes into the output buffer, the pointer into the output buffer 615 may be incremented. Some other possible relationships include "is greater than" and "is less than". Some or all of the registers 620 may be linked to, or within, the set of control registers 505, and may be set (i.e., written to) by the host.

As mentioned above, the vectorized table scanning circuit 510 may include a plurality of table scanning circuits 515. These may be employed to perform a plurality of table scan operations in parallel, for example if a table is to be scanned several times (for a respective plurality of conditions), if several tables are to be scanned, or if the scanning of a table is to be accelerated by splitting it into a plurality of portions and having each of the table scanning circuits 515 perform a table scan operation of a respective portion. The table scanning circuits may be pipelined so that one test is performed for each clock cycle, and they may be vectorized so that comparisons are performed in parallel.

Figure 7:
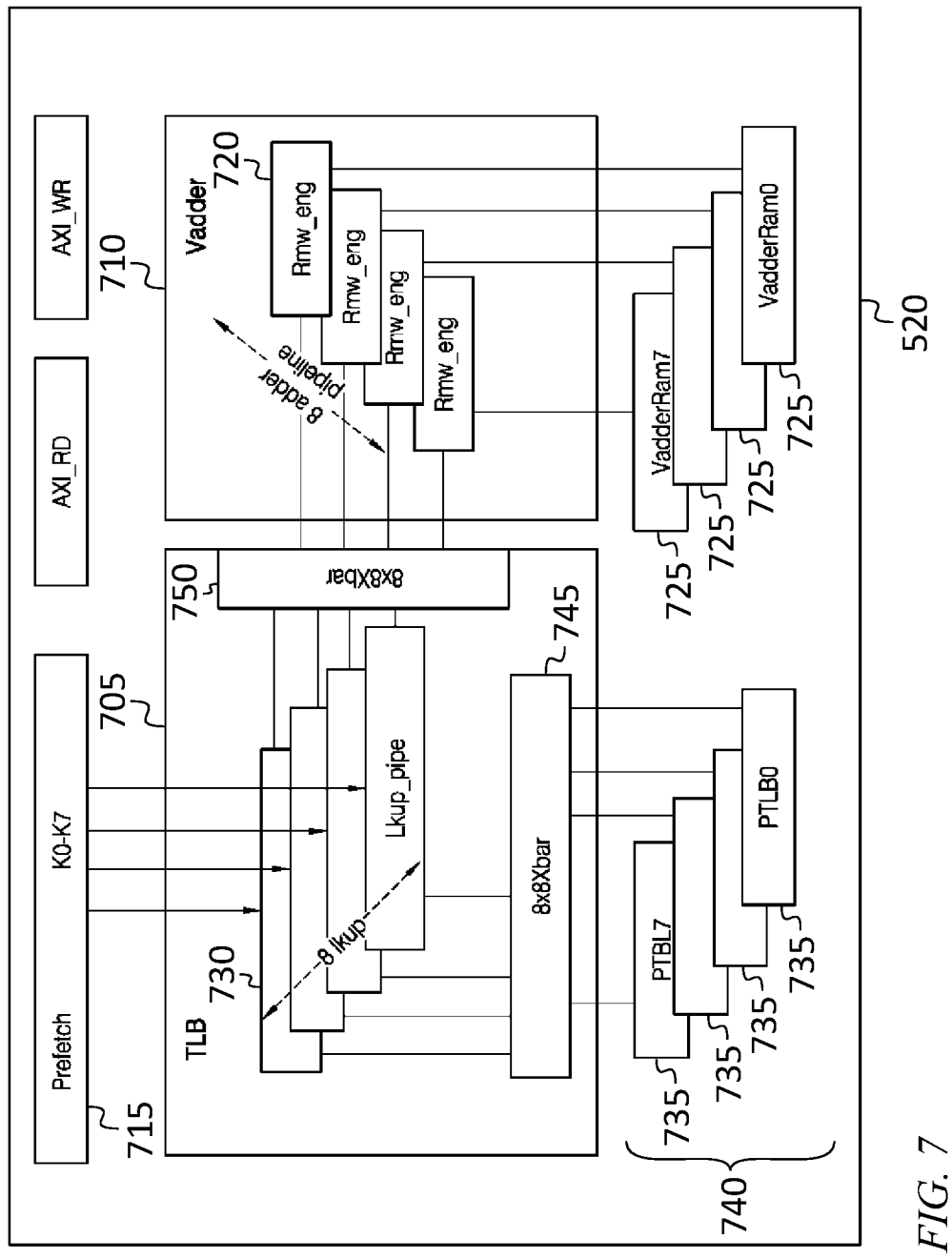
FIG. 7 is a block diagram of a sum aggregation circuit, according to an embodiment of the present disclosure.

Referring to FIG. 7, in some embodiments the sum aggregation circuit 520 includes a control circuit 705, a vectorized adder 710, and a prefetch buffer 715. The sum aggregation circuit 520 may be a synchronous circuit in a single clock domain (having a single clock, referred to as the "system clock" for the circuit). The vectorized adder 710 includes a plurality of read-modify-write circuits 720 each of which may be connected to a respective sum buffer 725. In operation, the prefetch circuit 525 copies a key value table (or a portion of such a table) into the prefetch buffer 715. Each key-value pair in the prefetch buffer 715 may be converted to an address-value pair by an address translation process described in further detail below, and the address-value pair may be sent to a respective one of the read-modify-write circuits 720. The read-modify-write circuit 720 then fetches the current value sum from the address (of the address-value pair) in the sum buffer 725, updates the value sum by adding to it the value from the address-value pair, and saves the updated value sum back into the sum buffer, at the address of the address-value pair (overwriting the value sum previously stored at that address). Each of the read-modify-write circuits 720 may be pipelined, so that, for example, a first stage in the pipeline performs the read operation, a second stage in the pipeline performs the addition, and a third stage in the pipeline performs the write operation, and so that the read-modify-write circuit 720 may be capable of receiving a new address-value pair during each cycle of the system clock. Once the entire key-value table has been processed, a new key-value table containing the sums may be formed by associating with each sum stored in the sum buffers 725 the key corresponding to the address at which the sum is stored.

The address translation process mentioned above may be advantageous because the key space may be quite large, corresponding to all possible 4-byte numbers (if each key is a 4-byte number), but any key value table may include only a small subset of the possible 4-byte numbers. The control circuit 705 may therefore perform address translation to translate each key to a respective address, the addresses forming a contiguous set of addresses. The control circuit 705 may include a plurality of lookup circuits 730, and a plurality of key address table buffers 735, together forming a key address table 740. In operation, each lookup circuit 730 may receive key-value pairs, one at a time, and (i) look up the address for the key by searching a key address table buffer 735, if one has been assigned, or (ii) generate a new address and assign it to the key, if no address has yet been assigned to the key. A next address register (which may be in the set of control registers 505 (FIG. 5)) may contain the next available address, and may be incremented each time an address is assigned to a key to which an address had not previously been assigned. Each key address table buffer 735 may be associated with a subset of the possible (4-byte) keys (e.g., based on the three least significant bits of the key (as discussed in further detail below), so that to search for the key in the key address table 740 it may only be necessary to search one of the key address table buffer 735. The keys may be stored in (increasing or decreasing) order in each key address table buffer 735 so that a log search may be used to search the key address table buffer 735. The lookup circuit 730 may be a pipeline comprising a plurality of stages for searching the key address table, each stage corresponding to a step in the log search, so that the lookup circuit 730 may receive a key with each cycle of the system clock.

The address table 740 may include, for example, 8 key address table buffers 735, each of which may be used to store addresses for keys based on the three least significant bits of the keys. For example, a first key address table buffer (PTLB0 in FIG. 7) may be used to store addresses for keys ending with (i.e., having as the three least significant bits) 000, a second key address table buffer may be used to store addresses for keys ending with 001, a third key address table buffer may be used to store addresses for keys ending with 010, and so on. A first 8×8 cross-bar switch 745 may be used to enable each of the lookup circuits 730 to access all of the key address table buffers 735. For example, in operation, one of the lookup circuits 730 (e.g., the eighth one) may receive a key-value pair having a key with 000 as the least significant three bits. It may then search PTLB0 for this key; if it is in PTLB0, it may fetch the corresponding address, and send the address-value pair to the read-modify-write circuits 720 to which the address is assigned.

The assignment of addresses to read-modify-write circuits 720 may also be done based on least significant bits, e.g., based on the three least significant bits of the address, if there are eight read-modify-write circuits 720, as for example in the embodiment of FIG. 7. For example if the address read from PTLB0 ends with 010, then the eighth lookup circuit may send the address and the value to the third one of the read-modify-write circuits 720. Routing of the address and value may be accomplished by a second 8×8 cross-bar switch 750. If the search for the key in PTLB0 results in not finding the key, then the eighth lookup circuit may store the key in PTLB0, along with the address in the next address register, increment the next address register, and send the key and the address to the read-modify-write circuit 720 to which the address is assigned. The next address register may be initialized to zero whenever a new sum aggregation operation is initiated. Collisions inside the cross-bar switches may be resolved by having arbitration at contending outputs. The rate at which collisions occur may be dependent on temporal locality of the input keys. Spreading sequential keys into eight slices enables parallelism and may reduce collisions.

Figure 8:
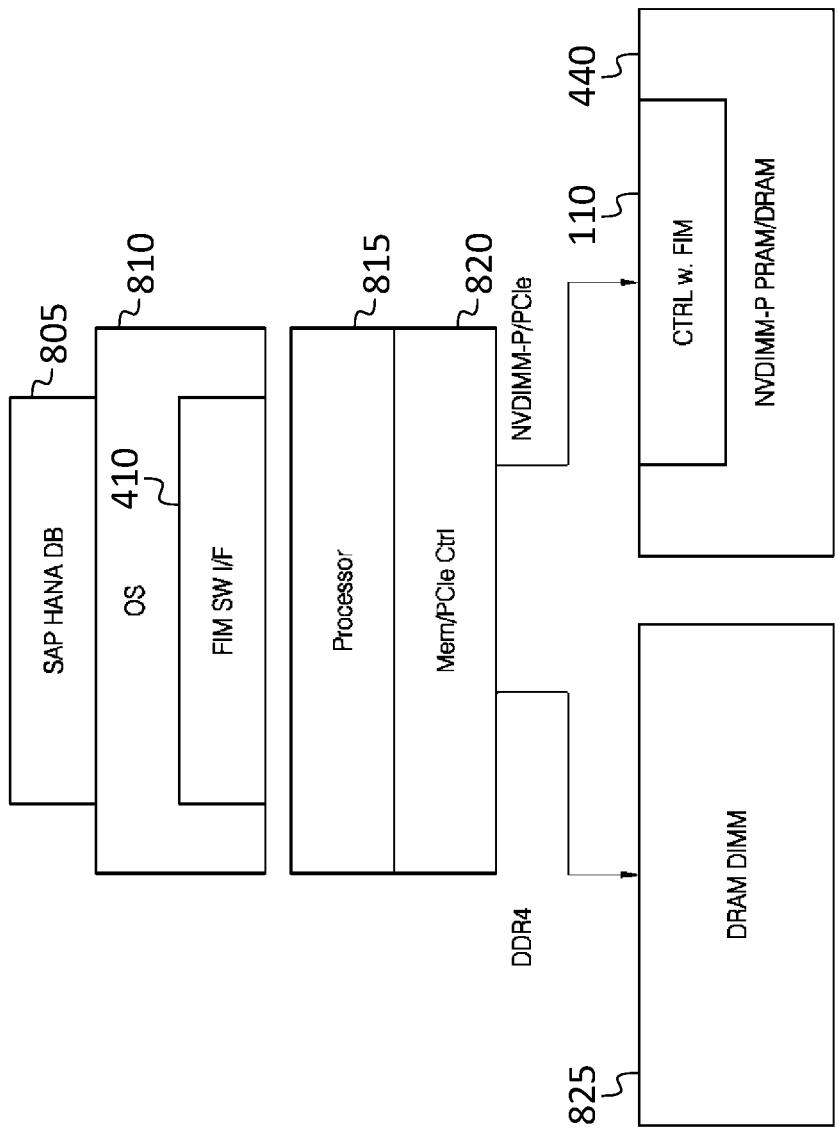
FIG. 8 is a hardware-software block diagram of a database processing system, according to an embodiment of the present disclosure.

In some embodiments, the database offloading engine has an NVDIMM-p (or memory channel) interface to the host (and the database offloading engine may be packaged in an NVDIMM-p form factor). The host may then interact with the database offloading engine through operating system calls that accommodate non-synchronous access to memory. Such a non-synchronous interface may facilitate the performing of operations in the database offloading engine (which may introduce delays that might be unacceptable if a synchronous memory interface were used). Such operations, when performed in a hardware element that appears, to the host, to be memory, may be referred to as "function-in-memory" (FIM) processing. Referring to FIG. 8, in some such embodiments, a database application 805, e.g., a SAP HANA database application, executes within an operating system 810, which includes a driver layer 410 that operates as a function-in-memory software interface. The host CPU 815 may communicate through a controller 820 (which may be a memory controller supporting both DRAM DIMM memory and NVDIMM-p memory if the database offloading engine has an NVDIMM-p interface, or which may be a combination of a memory controller and a PCIe controller if the database offloading engine has a PCIe interface) with the host main memory 825 and with the database offloading engine.

If the database offloading engine has an NVDIMM-p interface, then the database application 805 running on the host may use the memory of the database offloading engine (e.g., the memories 410 (FIG. 4)) to store database tables regardless of whether table scan operations or sum aggregation operations are to be performed on them. Various database operations may be performed on the tables, and the results stored in other tables in the memory of the database offloading engine. When a table scan operation or sum aggregation operation is needed, the host CPU may simply instruct the database offloading engine to perform the operation, on tables already in the memory of the database offloading engine.

By contrast, if the database offloading engine has a PCIe interface, then generally storing the tables in the memory of the database offloading engine may be inefficient, because the speed of performing host CPU operations on the data in the tables may be significantly reduced by the need to transfer data to and from the host CPU through the PCIe interface. Accordingly, if the database offloading engine has a PCIe interface, the tables of the database may generally be stored in the host main memory 825, and copied to the memory of the database offloading engine as needed for performing table scan operations or sum aggregation operations in the database offloading engine. Because of the need to copy tables to and from the database offloading engine in such embodiments, it may be the case that embodiments in which the database offloading engine has an NVDIMM-p interface may generally outperform embodiments in which the database offloading engine has a PCIe interface.

Figure 9A:
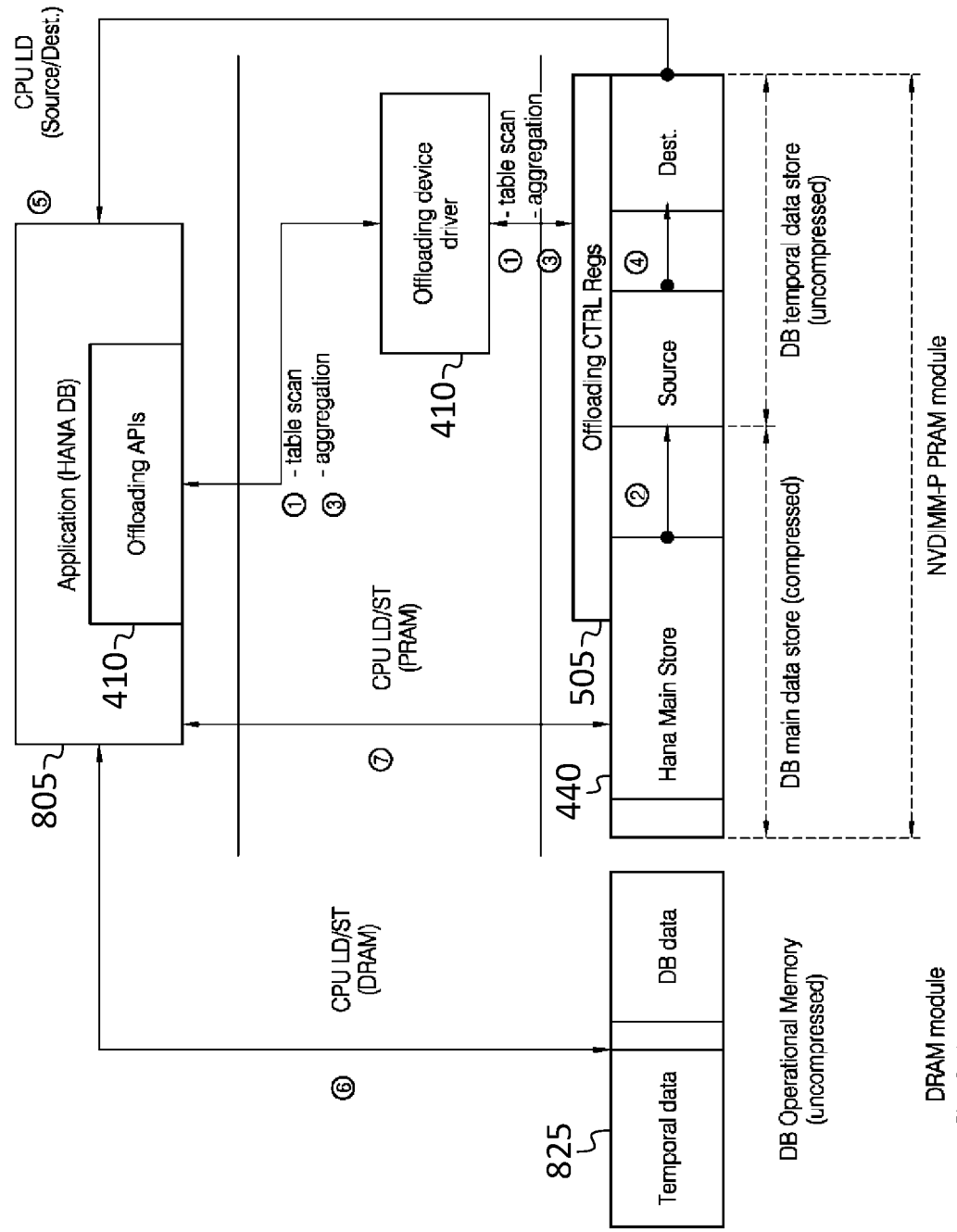
FIG. 9A is a process flow diagram of a database processing operation, according to an embodiment of the present disclosure.

Referring to FIG. 9A, in an embodiment in which the database offloading engine has an NVDIMM-p interface, temporary (or "temporal") data may be stored in the host main memory 825. The database main store (or "Hana Main Store") may be stored in the memories 440 of (or connected to) the database offloading engine, to which the host CPU, and the database application 805 and the driver layer or layers 410, which run on the host CPU, interface through the set of control registers 505. Database operations may include decompressing one or more tables in the database main store to form source data, and processing the source data (with database operations performed by the host CPU, or, in the case of table scan operations or sum aggregation operations, by the database offloading engine), to form destination data. In such an embodiment, the host may generate a query plan, and call functions in the offloading APIs that cause the device driver to command the offloading engine to perform sum aggregation operations or table scan operations. The database offloading engine may then uncompress table data from the database main store as needed, save the uncompressed data in a source region of the memory, perform the sum aggregation operations or table scan operations in a pipelined, vectorized manner, and store the results of the sum aggregation operations or table scan operations in a destination region of the memory. The host may then read the results from the destination region of the memory and perform additional database operations as needed.

Figure 9B:
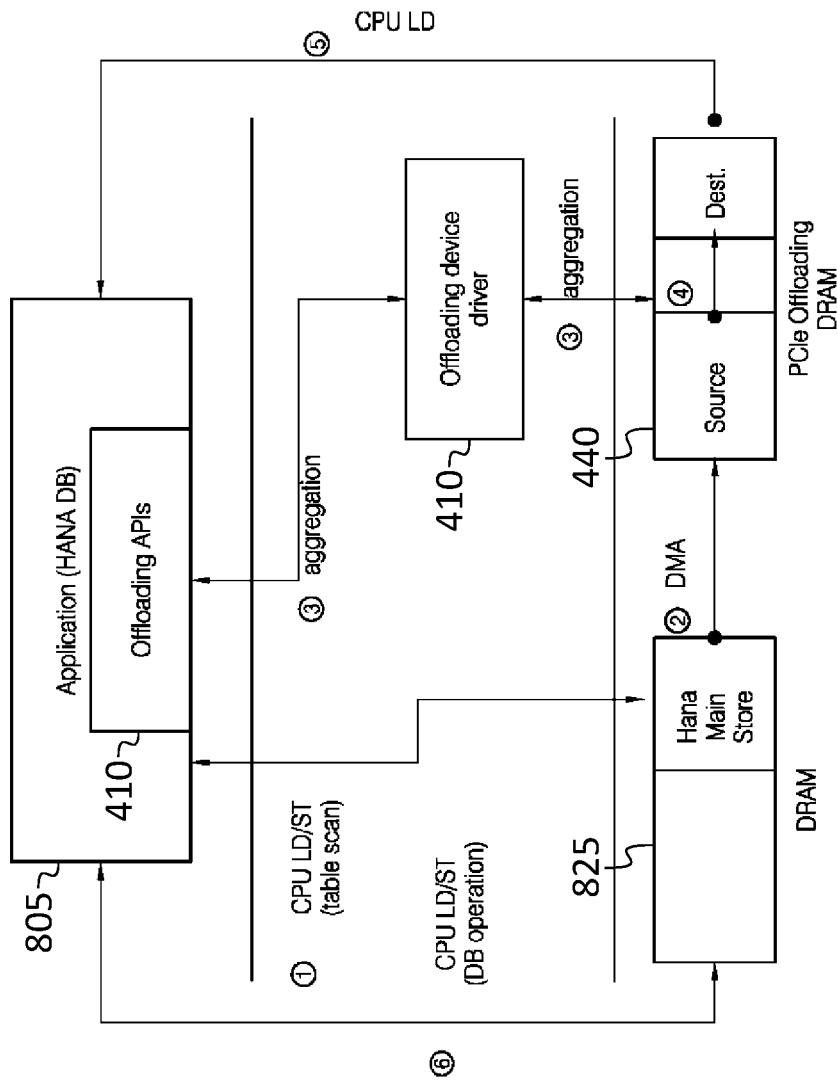
FIG. 9B is a process flow diagram of a database processing operation, according to an embodiment of the present disclosure.

Referring to FIG. 9B, in an embodiment in which the database offloading engine has a PCIe interface, the database main store may instead be in the host main memory 825. To perform table scan operations or sum aggregation operations, the compressed data may be copied from the host main memory 825 to the memories 440 of (or connected to) the database offloading engine using direct memory access (DMA) (e.g., direct memory access initiated by the database offloading engine), decompressed in the database offloading engine to form source data, and processed (with table scan operations or sum aggregation operations) to form destination data. In such an embodiment, the host may generate a query plan, and call functions in the offloading APIs that cause the device driver to command the offloading engine to perform sum aggregation operations or table scan operations. The database offloading engine may then copy data from the database main store in the host main memory 825, using direct memory access, into a source region of the memory of the database offloading engine. The database offloading engine may then uncompress table data from the source region of the memory as needed, save the uncompressed data in the source region of the memory, perform the sum aggregation operations or table scan operations in a pipelined, vectorized manner, and store the results of the sum aggregation operations or table scan operations in a destination region of the memory. The host may then read the results from the destination region of the memory through the PCIe interface, and perform additional database operations as needed.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a database offloading engine have been specifically described and illustrated herein, many modifications and variations will be apparent to those skilled in the art. Accordingly, it is to be understood that a database offloading engine constructed according to principles of this disclosure may be embodied other than as specifically described herein. The invention is also defined in the following claims, and equivalents thereof.

What is claimed is:

1. A database processing system, comprising a processor, memory, and a database offloading engine, the database offloading engine comprising:
    a vectorized adder comprising first and second read-modify-write circuits configured to perform a sum aggregation operation;
    first and second sum buffers respectively connected to the first and second read-modify-write circuits;
    a key address table; and
    a control circuit,
    the control circuit being configured:
        to receive a first key and a corresponding first value;
        to search the key address table for the first key; and
        in response to finding, in the key address table, an address corresponding to the first key, to route the address and the first value to one of the first and second read-modify-write circuits corresponding to the address.

2. The database processing system of claim 1, wherein the control circuit is further configured:
    to receive a second key and a corresponding second value;
    to search the key address table for the second key;
    to select a new address;
    to store the second key and the new address in the key address table; and
    to route the new address and the second value to one of the first and second read-modify-write circuits corresponding to the new address.

3. The database processing system of claim 1, wherein the database offloading engine has an NVDIMM-p interface for making a connection to a host.

4. The database processing system of claim 1, wherein the database offloading engine has a PCIe interface for making a connection to a host.

5. The database processing system of claim 1, wherein:
    the vectorized adder is a synchronous circuit within one clock domain, the clock domain being defined by a shared system clock,
    one of the first and second read-modify-write circuits is configured as a pipeline comprising:
        a first stage for performing a read operation,
        a second stage for performing an addition operation, and
        a third stage for performing a write operation, and
    the pipeline is configured to receive an address and a corresponding value with each cycle of the shared system clock.

6. The database processing system of claim 1, wherein:
    the control circuit is a synchronous circuit within one clock domain, the clock domain being defined by a shared system clock,
    the control circuit comprises a lookup circuit for searching the key address table for a key,
    the lookup circuit is configured as a pipeline comprising at least first and second stages for searching the key address table,
    the pipeline is configured to receive a key with each cycle of the shared system clock.

7. The database processing system of claim 1, further comprising a host connected to the database offloading engine, the host comprising a non-transitory storage medium storing:
    database application instructions, and
    driver layer instructions,
    the database application instructions including function calls that, when executed by the host, cause the host to execute driver layer instructions that cause the host to control the database offloading engine to perform the sum aggregation operation.

8. The database processing system of claim 1, wherein the database offloading engine further comprises first and second table scanning circuits;
one of the first and second table scanning circuits comprising:
a condition test circuit programmable with a condition,
an input buffer, and
an output buffer,
the condition test circuit being configured:
to determine that the condition is satisfied for a first entry at a first address in the input buffer, and
in response to determining that the condition is satisfied for the first entry, to write a corresponding result into the output buffer.

9. The database processing system of claim 8, wherein the condition test circuit is configured, in response to determining that the condition is satisfied for the first entry, to write a one to a corresponding element of an output vector in the output buffer.

10. The database processing system of claim 8, wherein the condition test circuit is configured, in response to determining that the condition is satisfied for the first entry, to write the first address to a corresponding element of an output vector in the output buffer.

11. The database processing system of claim 8, wherein:
the vectorized adder is a synchronous circuit within one clock domain, the clock domain being defined by a shared system clock,
one of the first and second read-modify-write circuits is configured as a pipeline comprising:
a first stage for performing a read operation,
a second stage for performing an addition operation, and
a third stage for performing a write operation, and
the pipeline is configured to receive an address and a corresponding value with each cycle of the shared system clock.

12. The database processing system of claim 8, wherein:
the control circuit is a synchronous circuit within one clock domain, the clock domain being defined by a shared system clock,
the control circuit comprises a lookup circuit for searching the key address table for a key,
the lookup circuit is configured as a pipeline comprising at least first and second stages for searching the key address table,
the pipeline is configured to receive a key with each cycle of the shared system clock.

13. The database processing system of claim 8, wherein the database offloading engine has an NVDIMM-p interface for making a connection to a host.

14. A method for offloading database operations from a host, the method comprising:
calling, by an application running on the host, a driver function for performing a sum aggregation operation,
performing the sum aggregation operation, by a database offloading engine,
the database offloading engine comprising:
a vectorized adder comprising first and second read-modify-write circuits;
first and second sum buffers respectively connected to the first and second read-modify-write circuits;
a key address table; and
a control circuit,
the performing of the sum aggregation operation comprising:
receiving a first key and a corresponding first value;
searching the key address table for the first key;
in response to finding, in the key address table, an address corresponding to the first key, routing the address and the first value to one of the first and second read-modify-write circuits corresponding to the address;
receiving a second key and a corresponding second value;
searching the key address table for the second key;
selecting a new address from the key address table;
storing the second key and the new address in the key address table; and
routing the new address and the second value to one of the first and second read-modify-write circuits corresponding to the new address.

15. The method of claim 14, further comprising:
calling, by the application, a driver function for performing a table scan operation,
performing the table scan operation, by the database offloading engine,
the performing of the table scan operation comprising:
determining, by a condition test circuit of the database offloading engine, that a condition is satisfied for a first entry at a first address in an input buffer of the database offloading engine, and
in response to determining that the condition is satisfied for the first entry in the input buffer, writing a corresponding result into an output buffer of the database offloading engine.

* * * * *